Patented June 10, 1941

2,245,530

UNITED STATES PATENT OFFICE 2,245,530

TAENIACIDE FOR POULTRY

Orley J. Mayfield and Jack P. Henry, Charles City, Iowa, assignors to Dr. Salsbury's Laboratories, a corporation of Iowa No Drawing. Application March 4, 1937, Serial No. 129,080

7 Claims. (Cl. 167—53.1)

This invention relates to medicine for internal consumption, particularly intended for poultry, birds and animals for expelling strobila and other worms, including both the scolex and proglottides.

The invention comprises certain organic drugs or chemicals combined with inert ingredients and pressed in tablet form for convenience in use, but is not restricted to this special form of preparation.

We have found that certain alkaloids which have a quaternary linkage may be combined with areca nut to form a taeniacide for poultry. This includes such alkaloids as nicotine, conium, quinoline and quinoline derivatives, strychnine and strychnine derivatives, curare, or any similar alkaloid which contains one or more nitrogen atoms and exists in its natural form as a quaternary compound or can be converted into quaternary compounds by chemical methods. In most cases the toxicity of the pure alkaloid has been greatly reduced by the conversion of the tertiary nitrogen over to a quaternary nitrogen.

For example, we have used with success a preferred embodiment of the invention comprising nicotine sulfate, nicotine mono-ethiodide and areca nut, compressed in tablet form with a suitable binding material such as glucose, in the proportion of 8 parts of the ingredients named to 2 parts of glucose binder.

Another form of the invention comprises a granule form made from the above proportions and materials.

Still another form of the invention is, either a tablet or granule comprising quinaldine ethiodide, nicotine sulfate and areca nut and glucose for a binder, or quinaldine, nicotine sulfate, areca nut and the binder glucose.

Another form of the invention comprises 2, 4 dimethylquinoline, nicotine sulfate, areca nut and a suitable binder such as glucose or starch, pressed into a tablet or made into the form of a granule.

Another form is the substitution of 2, 4 dimethylquinoline ethiodide for the 2, 4 dimethylquinoline in the preceding composition.

In most cases this taeniacide for poultry will cause the removal of worms in approximately three hours.

We have found that these quaternary nitrogen containing compounds when pressed into a pellet form together with such laxatives as mentioned above are readily administered and are effective as a poultry taeniacide without harmful after effects.

Although the examples given of the invention relate to poultry, this word is used generally to include all domestic and wild fowl, birds, and small mammals.

We claim the following as our invention.

1. An internal remedy for poultry and creatures subject to worms comprising nicotine monoethiodide and areca nut.

2. An internal remedy for poultry and creatures subject to worms comprising a derivative of quinoline having nitrogen in quaternary form and areca nut.

3. An internal remedy for poultry and creatures subject to worms comprising quinaldine ethiodide and areca nut.

4. An internal remedy for poultry and creatures subject to worms comprising dimethyl quinoline ethiodide and areca nut.

5. An internal remedy for poultry and creatures subject to worms comprising a nicotine derivative having nitrogen in quaternary form and areca nut.

6. An internal remedy for poultry and creatures subject to worms comprising a quinaldine derivative having nitrogen in quaternary form and areca nut.

7. An internal remedy for poultry and creatures subject to worms comprising an alkaloid substance having nitrogen in quaternary form and areca nut.

ORLEY J. MAYFIELD.
JACK P. HENRY.